United States Patent
Wang et al.

(10) Patent No.: US 11,682,227 B2
(45) Date of Patent: Jun. 20, 2023

(54) BODY AND HAND ASSOCIATION METHOD AND APPARATUS, DEVICE, AND STORAGE MEDIUM

(71) Applicant: SENSETIME INTERNATIONAL PTE. LTD., Singapore (SG)

(72) Inventors: Bairun Wang, Singapore (SG); Xuesen Zhang, Singapore (SG); Chunya Liu, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 164 days.

(21) Appl. No.: 17/363,203

(22) Filed: Jun. 30, 2021

(65) Prior Publication Data
US 2022/0405502 A1 Dec. 22, 2022

Related U.S. Application Data

(63) Continuation of application No. PCT/IB2021/055732, filed on Jun. 28, 2021.

(30) Foreign Application Priority Data

Jun. 22, 2021 (SG) ............... 10202106806S

(51) Int. Cl.
*G06K 9/00* (2022.01)
*G06V 40/10* (2022.01)
(Continued)

(52) U.S. Cl.
CPC ............ *G06V 40/107* (2022.01); *G06F 18/22* (2023.01); *G06T 7/70* (2017.01); *G06V 40/103* (2022.01); *G06T 2207/30196* (2013.01)

(58) Field of Classification Search
None
See application file for complete search history.

(56) References Cited

U.S. PATENT DOCUMENTS

| 11,238,593 B2* | 2/2022 | Turgutlu .............. G06V 10/774 |
| 2015/0046375 A1* | 2/2015 | Mandel .................... G06N 5/04 706/11 |

(Continued)

FOREIGN PATENT DOCUMENTS

| CN | 110647834 A | 1/2020 |
| CN | 110674719 A | 1/2020 |

(Continued)

OTHER PUBLICATIONS

"Hier R-CNN: Instance-Level Human Parts Detection and A New Benchmark", Oct. 2020, Lu Yang, Qing Song, Zhihui Wang, Mengjie Hu and Chun Liu, IEEE Transactions on Image Processing, vol. 30, Reprinted from the Internet at: <DOI: 10.1109/TIP.2020.3029901>Figures 10 & 11, pp. 39-54.

(Continued)

*Primary Examiner* — Soo Jin Park
(74) *Attorney, Agent, or Firm* — Cooper Legal Group, LLC

(57) ABSTRACT

A body and hand association method includes: an image to be detected of which an image content includes a body and a hand is acquired; a body bounding box of the body and a hand bounding box of the hand are determined in the image to be detected; an association probability between the body bounding box and the hand bounding box is determined; a circumscribed box of the body bounding box and the hand bounding box is determined; and a degree of association between the body and hand in the circumscribed box is determined based on a hand key point in the circumscribed box and the association probability.

20 Claims, 7 Drawing Sheets

(51) Int. Cl.
*G06T 7/70* (2017.01)
*G06F 18/22* (2023.01)

(56) References Cited

U.S. PATENT DOCUMENTS

| | | | |
|---|---|---|---|
| 2019/0213406 A1* | 7/2019 | Porikli | G06V 20/41 |
| 2021/0104114 A1* | 4/2021 | Eager | G07F 17/3223 |
| 2021/0312187 A1 | 10/2021 | Que et al. | |
| 2022/0148296 A1* | 5/2022 | Brown | G06F 18/256 |
| 2022/0262093 A1* | 8/2022 | Zhou | G06V 40/113 |

FOREIGN PATENT DOCUMENTS

| | | |
|---|---|---|
| CN | 111079554 A | 4/2020 |
| CN | 112506340 A | 3/2021 |
| SG | 10201913024 | 10/2020 |
| SG | 10201913763 | 4/2021 |

OTHER PUBLICATIONS

International Search Report in the international application No. PCT/IB2021/055732, dated Oct. 18, 2021, 5 pgs.
Written Opinion of the Singaporean application No. 10202106806S, dated Oct. 19, 2021, 9 pgs.

\* cited by examiner

BODY AND HAND ASSOCIATION METHOD AND APPARATUS, DEVICE, AND STORAGE MEDIUM

CROSS-REFERENCE TO RELATED APPLICATIONS

This application is a continuation of International Application No. PCT/IB2021/055732, filed on Jun. 28, 2021, which claims priority to Singaporean Patent Application No. 10202106806S, filed with IPOS on 22 Jun. 2021. The disclosures of International Application No. PCT/IB2021/055732 and Singaporean Patent Application No. 10202106806S are hereby incorporated by reference in their entireties.

BACKGROUND

In a complex scene with many people, there is usually such a phenomenon that a person is occluded by another person or arms are crossed. In the related art, a person that a hand belongs to is usually judged by use of a sensor on the basis of detecting a hand key point using Human Keypoints Detection (HKD), which cannot ensure the judgment accuracy, and is relatively high in judgment cost.

SUMMARY

Embodiments of the disclosure relate to the technical field of image processing, and particularly, but not limited to, a body and hand association method and apparatus, a device, and a storage medium.

The embodiments of the disclosure provide technical solutions to body and hand association.

The technical solutions of the embodiments of the disclosure are implemented as follows.

The embodiments of the disclosure provide a body and hand association method, which may include the following operations. An image to be detected of which an image content includes a body and a hand is acquired. A body bounding box of the body and a hand bounding box of the hand are determined in the image to be detected. An association probability between the body bounding box and the hand bounding box is determined. A circumscribed box of the body bounding box and the hand bounding box is determined. A degree of association between the body and hand in the circumscribed box is determined based on a hand key point in the circumscribed box and the association probability.

The embodiments of the disclosure provide a body and hand association apparatus including a memory storing processor-executable instructions; and a processor configured to execute the stored processor-executable instructions to perform operations of: acquiring an image to be detected of which an image content comprises a body and a hand; determining a body bounding box of the body and a hand bounding box of the hand in the image to be detected; determining an association probability between the body bounding box and the hand bounding box; determining a circumscribed box of the body bounding box and the hand bounding box; and determining a degree of association between the body and hand in the circumscribed box based on a hand key point in the circumscribed box and the association probability.

The embodiments of the disclosure provide a non-transitory computer storage medium having stored thereon computer-executable instructions that, when executed by a processor, cause the processor to perform operations of: acquiring an image to be detected of which an image content comprises a body and a hand; determining a body bounding box of the body and a hand bounding box of the hand in the image to be detected; determining an association probability between the body bounding box and the hand bounding box; determining a circumscribed box of the body bounding box and the hand bounding box; and determining a degree of association between the body and hand in the circumscribed box based on a hand key point in the circumscribed box and the association probability.

BRIEF DESCRIPTION OF THE DRAWINGS

In order to describe the technical solutions of the embodiments of the disclosure more clearly, the drawings required to be used in the descriptions about the embodiments will be simply introduced below. It is apparent that the drawings described below are merely some embodiments of the disclosure. Other drawings may further be obtained by those of ordinary skill in the art according to these drawings without creative work.

DETAILED DESCRIPTION

Figure 1:
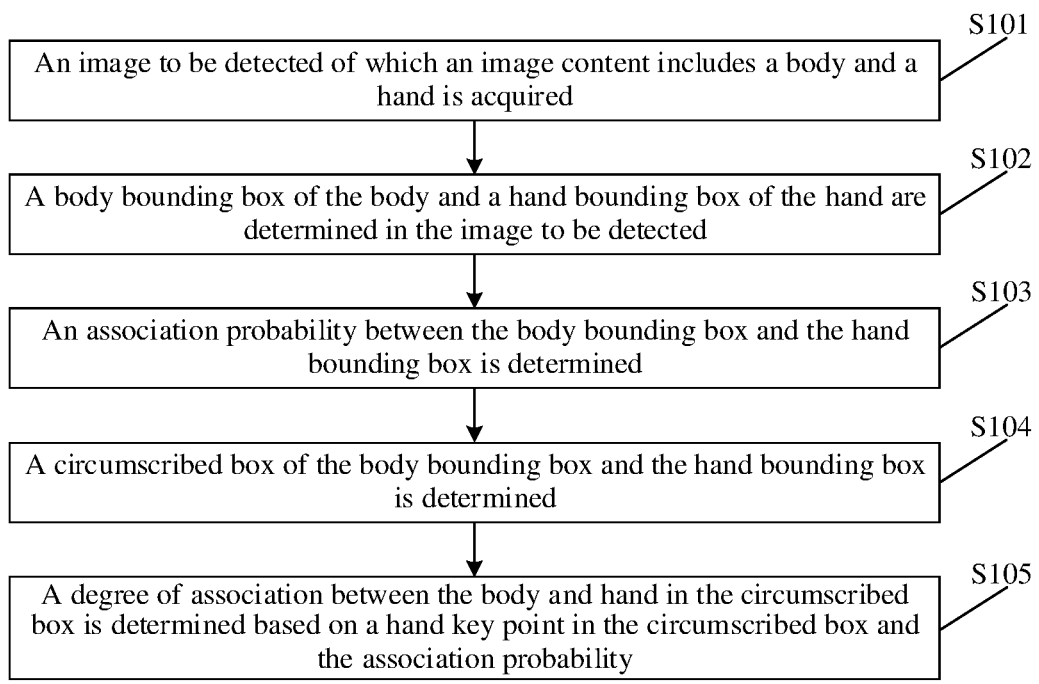
FIG. 1 is a flowchart of a body and hand association method according to an embodiment of the disclosure.

In order to make the purposes, technical solutions, and advantages of the embodiments of the disclosure clearer, specific technical solutions of the disclosure will further be described below in combination with the drawings in the embodiments of the disclosure in detail. The following embodiments are used to describe the embodiments of the disclosure rather than limit the scope of the embodiments of the disclosure.

"Some embodiments" involved in the following descriptions describes a subset of all possible embodiments. However, it can be understood that "some embodiments" may be the same subset or different subsets of all the possible embodiments, and may be combined without conflicts.

Term "first/second/third" involved in the following descriptions is only for distinguishing similar objects, and does not represent a specific sequence of the objects. It can be understood that "first/second/third" may be interchanged to specific sequences or orders if allowed to implement the embodiments of the disclosure described herein in sequences except the illustrated or described ones.

Unless otherwise defined, all technological and scientific terms used in the disclosure have meanings the same as those usually understood by those skilled in the art of the embodiments of the disclosure. Terms used in the disclosure are only adopted to describe the embodiments of the disclosure and not intended to limit the embodiments of the disclosure.

Before the embodiments of the disclosure are further described in detail, nouns and terms involved in the embodiments of the disclosure will be described. The nouns and terms involved in the embodiments of the disclosure are suitable for the following explanations.

1) Computer Vision (CV), as a science researching how to make machines "see", refers to recognizing, tracking, and measuring targets using video cameras and computers instead of human eyes, and further performing image processing.

2) Deep Learning (DL) is introduced to Machine Learning (ML) as a new research direction in the field of ML to make ML closer to the initial goal: Artificial Intelligence (AI). DL refers to learning inherent laws and representation layers of sample data. Information obtained in these learning processes helps greatly the interpretation of data such as texts, images, and sounds. The final goal of DL is to make machines able to analyze and learn like humans, and able to recognize data such as texts, images, and sounds.

3) HKD, also called human pose estimation, is a relatively elementary task in CV, as well as a predecessor task of human action recognition, behavior analysis, human-computer interaction, etc. Under a normal condition, HKD may be subdivided into single-person/multi-person key point detection and two-dimensional/three-dimensional key point detection. In addition, in some algorithms, key point tracking, also called human pose tracking, may further be performed after key point detection is completed.

4) Association algorithm is a kind of important algorithm in data mining Association reflects knowledge about a dependence or association between an event and another event.

5) Confidence: in statistics, a confidence interval of a probability sample is an interval estimate of a certain population parameter of the sample. The confidence interval presents a degree that a true value of the parameter falls around a measurement result at a certain probability. The confidence interval defines a reliability range of the measured value of the measured parameter, i.e., the previously required "certain probability". This probability is called a confidence level.

An exemplary application of a body and hand association device provided in the embodiments of the disclosure will be described below. The device provided in the embodiments of the disclosure may be implemented as various types of user terminals with an image collection function, such as a notebook computer, a tablet computer, a desktop computer, a camera, and a mobile device (e.g., a personal digital assistant, a dedicated messaging device, and a portable game device), or may be implemented as a server. The exemplary application of the device implemented as the terminal or the server will be described below.

A method may be applied to a computer device. A function realized by the method may be realized by calling a program code through a processor in the computer device. Of course, the program code may be stored in a computer storage medium. It can be seen that the computer device at least includes the processor and the storage medium.

The embodiments of the disclosure provide a body and hand association method. As shown in FIG. 1, descriptions will be made in combination with operations shown in FIG. 1.

In S101, an image to be detected of which an image content includes a body and a hand is acquired.

In some embodiments, the image to be detected may be acquired by a body and hand association apparatus through an internal image collection module. Alternatively, the image to be detected may be received from an apparatus or device capable of performing information interaction with the body and hand association apparatus. Correspondingly, the image to be detected may be a color image, or may be a gray image. The body and the hand may be in a foreground region, medium shot region, and background region in the image to be detected. A region where the body and hand are located in the image to be detected is not limited in the embodiment of the disclosure.

In some embodiments, the body in the image to be detected refers to a body of which all body information may be presented in the image to be detected, or a body of which part of body information is presented. In a case that all the body information of the body is presented in the image to be detected, such as the head, the two arms, the whole trunk, and the two legs, or part of the body information is presented, such as the head, one arm, and the two legs, the hand in the image to be detected may refer to left hand information, right hand information, left and right hand information, etc., presented in the image to be detected.

In some embodiments, pose information of the body in the image to be detected may be standing, walking, sitting, etc. Correspondingly, pose information of the hand in the image to be detected may be unclenched or clenched, or may be partially clenched, etc.

In some embodiments, the image content of the image to be detected includes, but not limited to, the body and the hand. The image content of the image to be detected may be that the body and hand are in any scene, such as a classroom, a park, an office, or a game place. In addition, the image content in the image to be detected may include one, two or more than two bodies and hands. Relative positional relationships between the bodies, between the hands, and between the bodies and the hands in the image content of the image to be detected may be left-right, front-back, one under the other, etc.

In S102, a body bounding box of the body and a hand bounding box of the hand are determined in the image to be detected.

In some embodiments, the body bounding boxy is a bounding boxy that may include a body part of the body in the image to be detected. Exemplarily, if all the body parts of the body may be presented in the image to be detected, the body bounding box is a minimum rectangular box that may enclose the head, two arms, whole trunk, two legs, etc., of the body. In addition, the body bounding box may enclose key points of, for example, the head, neck, shoulders, elbows, hands, hips, knees, and feet of the body. Exemplarily, if part of the body parts of the body may be presented in the image to be detected, the body bounding box is a minimum rectangular box that may enclose the head, one arm, partial trunk, etc., of the body.

In some embodiments, the hand bounding box of the hand may be a part of the hand presented in the image to be detected. Exemplarily, if the whole hand may be presented in the image to be detected, the hand bounding box is a minimum rectangular box that may enclose the fingertips, interphalangeal joints, etc., of the hand. If part of information of the hand may be presented in the image to be detected, the hand bounding box is a minimum rectangular box that may enclose part of fingertips, part of interphalangeal joints, etc., of the hand.

In some embodiments, a positional relationship between the body bounding box of the body and the hand bounding box of the hand may be partial overlapping or neighboring, or may even be that the hand bounding box is in the body bounding box, etc. In addition, a size of the body bounding box is determined based on a size, presented in the image to be detected, of the body. Correspondingly, a size of the hand bounding box is determined based on a size, presented in the image to be detected, of the hand.

In some embodiments, it is assumed that the image to be detected includes multiple bodies and multiple hands. Each body corresponds to a body bounding box, and there may be a relationship such as overlapping, partial overlapping, and neighboring between the body bounding boxes corresponding to different bodies. Each hand corresponds to a hand bounding box, and there may be a relationship such as overlapping, partial overlapping, and neighboring between the hand bounding boxes corresponding to different hands. In addition, the hand bounding boxes may be divided into two major types: i.e., left hand bounding boxes and right hand bounding boxes.

In some implementation modes, the body and hand in the image to be detected respectively through a trained detection model to determine the corresponding body bounding box and hand bounding box.

In some embodiments, the body bounding box and the hand bounding box may be generated based on a target detection algorithm. Exemplarily, in the embodiment of the disclosure, the target detection algorithm, such as a Fast Region Convolutional Neural Network (Fast R-CNN), a Faster R-CNN, and a Region based Fully Convolutional Neural Network (R-FCN), may be used to detect the body and hand in the image to be detected to obtain the body bounding box of the body and the hand bounding box of the hand. Target detection based on the Faster R-CNN may be implemented through the following four basic steps, such as candidate region generation, feature extraction, classification, and position refinement. As such, more accurate body bounding box and hand bounding box may be determined rapidly and conveniently. In addition, use of the target detection algorithm may reduce calculations.

In S103, an association probability between the body bounding box and the hand bounding box is determined.

In some embodiments, the association probability may refer to an association degree between the body bounding box and the hand bounding box, or an association possibility therebetween. Here, "association" refers to that there is a belonging relationship between physical objects represented by the two bounding boxes, for example, there is a belonging relationship between the hand and the body. The association degree or the association possibility may be determined based on color features, texture features, shape feature, spatial relationship features, etc., between the body bounding box and the hand bounding box. Exemplarily, in the embodiment of the disclosure, if the association probability between the body bounding box and the hand bounding box is relatively high, it indicates that an association degree between related feature information of the body bounding box and the hand bounding box is relatively high. Similarly, if the association probability between the body bounding box and the hand bounding box is relatively low, it indicates that the association degree between the related feature information of the body bounding box and the hand bounding box is relatively low.

In some embodiments, the association probability between the body bounding box and the hand bounding box may be determined through a related association algorithm. Correspondingly, the association probability may be represented as a decimal, a fraction, a percentage, etc. A numerical value of the association probability may be 90%, 0.75, etc.

In a possible implementation mode, a body feature of the body bounding box and a hand feature of the hand bounding box may be acquired to determine the association probability between the body bounding box and the hand bounding box, which may be implemented through the following process.

At block 1, a body feature of the body bounding box and a hand feature of the hand bounding box are determined.

In some embodiments, the body feature may refer to a color feature, texture feature, shape feature, and spatial relationship feature of the body in the body bounding box. Exemplarily, the body feature may refer to pose information, relative position information, color information, etc., of the body in the body bounding box. The hand feature may refer to a color feature, texture feature, shape feature, and spatial relationship feature of the hand in the hand bounding box. Exemplarily, the hand feature may refer to pose information, relative position information, color information, etc., of the hand in the hand bounding box.

In some embodiments, the body feature of the body bounding box and the hand feature of the hand bounding box may be extracted and determined through a feature extraction model. As such, a more accurate body feature in the body bounding box and a more accurate hand feature in the hand bounding box may be determined, and furthermore, the accuracy of determining an association between the body bounding box and the hand bounding box may be improved based on the relatively accurate body feature and hand feature.

At block 2, the association probability between the body bounding box and the hand bounding box is determined based on the body feature and the hand feature.

In some embodiments, the body feature and the hand feature are correlated through an association algorithm to determine the association probability between the body bounding box and the hand bounding box. Exemplarily, feature information matching may be performed on the body feature and the hand feature to further determine the association probability between the body bounding box and the hand bounding box. In this manner, information matching is performed on the body feature and the hand feature to determine the association probability between the body bounding box and the hand bounding box, so that the accuracy of determining the association between the body bounding box and the hand bounding box may be improved.

In some possible embodiments, feature extraction is performed on the body bounding box and the hand bounding box using the feature extraction model respectively to obtain the corresponding body feature and hand feature. As such, the body feature and the hand feature may be extracted rapidly and accurately to further determine the association probability between the body bounding box and the hand bounding box based on the extracted body feature and hand feature, and furthermore, the accuracy of determining the association between the body bounding box and the hand bounding box may be improved.

In S104, a circumscribed box of the body bounding box and the hand bounding box is determined.

In some embodiments, the circumscribed box may refer to a minimum rectangular box that may enclose the body bounding box and the hand bounding box, or may refer to a minimum rectangular box that is formed by a body bounding box and a hand bounding box between which an association probability is greater than a preset probability threshold and that may enclose the body bounding box and the hand bounding box. Exemplarily, the circumscribed box may be determined based on the body bounding box, the hand bounding box, and a relative positional relationship between the body bounding box and the hand bounding box. Information in the circumscribed box includes, but not limited to, feature information of the body bounding box and feature information of the hand bounding box. In addition, the hand bounding box in the circumscribed box may be at any position in the circumscribed box.

In some embodiments, the hand bounding box includes a right hand bounding box and a left hand bounding box. The body bounding box may form two circumscribed boxes with the right hand bounding box and the left hand bounding box respectively. The two circumscribed boxes may positionally overlap, or completely overlap, etc.

In some embodiments, in a case that there are multiple body bounding boxes and multiple hand bounding boxes, each body bounding box and each hand bounding box form a circumscribed box. A size of the circumscribed box is determined by the sizes of the body bounding box and the hand bounding box. In addition, positional relationships between the circumscribed boxes in the image to be detected are determined by the body bounding boxes and the hand bounding boxes.

In S105, a degree of association between the body and hand in the circumscribed box is determined based on a hand key point in the circumscribed box and the association probability.

In some embodiments, the hand key point in the circumscribed box may refer to hand palm center information or hand wrist key point information in the circumscribed box. Exemplarily, it is assumed that the hand key point refers to the hand wrist key point information, i.e., information of a wrist joint of the hand. The hand wrist key point information may include a confidence that a hand wrist key point is a ground truth point and a distance from the hand wrist key point to the hand bounding box that forms the circumscribed box. For example, a confidence that a left wrist key point is a ground truth point, a confidence that a right wrist key point is a ground truth point, a distance from a right wrist key point to the hand bounding box that forms the circumscribed box, and a distance from a left wrist key point to the hand bounding box that forms the circumscribed box are included. The hand wrist refers to part information, that connects the palm with the forearm, of the body.

In some embodiments, the degree of association may refer to an association degree between the body, i.e., the body bounding box, and hand, i.e., the hand bounding box, in the circumscribed box. The association degree may be represented by a numerical value, such as 0 to 100. Exemplarily, if the body bounding box is uncorrelated with the hand bounding box, the numerical value corresponding to the association degree is 0. If the body bounding box is highly correlated with the hand bounding box, the numerical value corresponding to the association degree may be represented as 80 to 100.

In some embodiments, the confidence that the hand key point in the circumscribed box is a ground truth point and the distance from the hand key point to the hand bounding box that forms the circumscribed box are judged to determine the degree of association between the body and hand in the circumscribed box. Exemplarily, the degree of association between the body and hand in the circumscribed box may also be represented as matched and mismatched, or highly correlated or generally correlated.

According to the body and hand association method provided in the embodiment of the disclosure, first, the body bounding box of the body and the hand bounding box of the hand are determined in the image to be detected of which the image content includes the body and the hand. Then, the association probability between the body bounding box and the hand bounding box is determined, and the circumscribed box of the body bounding box and the hand bounding box is determined. Finally, the degree of association between the body and hand in the circumscribed box is determined based on the hand key point in the circumscribed box and the association probability. In this manner, the degree of association between the body and hand in the circumscribed box is determined based on the association probability between the body bounding box and the hand bounding box and the hand key point in the circumscribed box of the body bounding box and the hand bounding box, so that the accuracy in association of the body bounding box and the hand bounding box in the circumscribed box may be improved.

Figure 2:
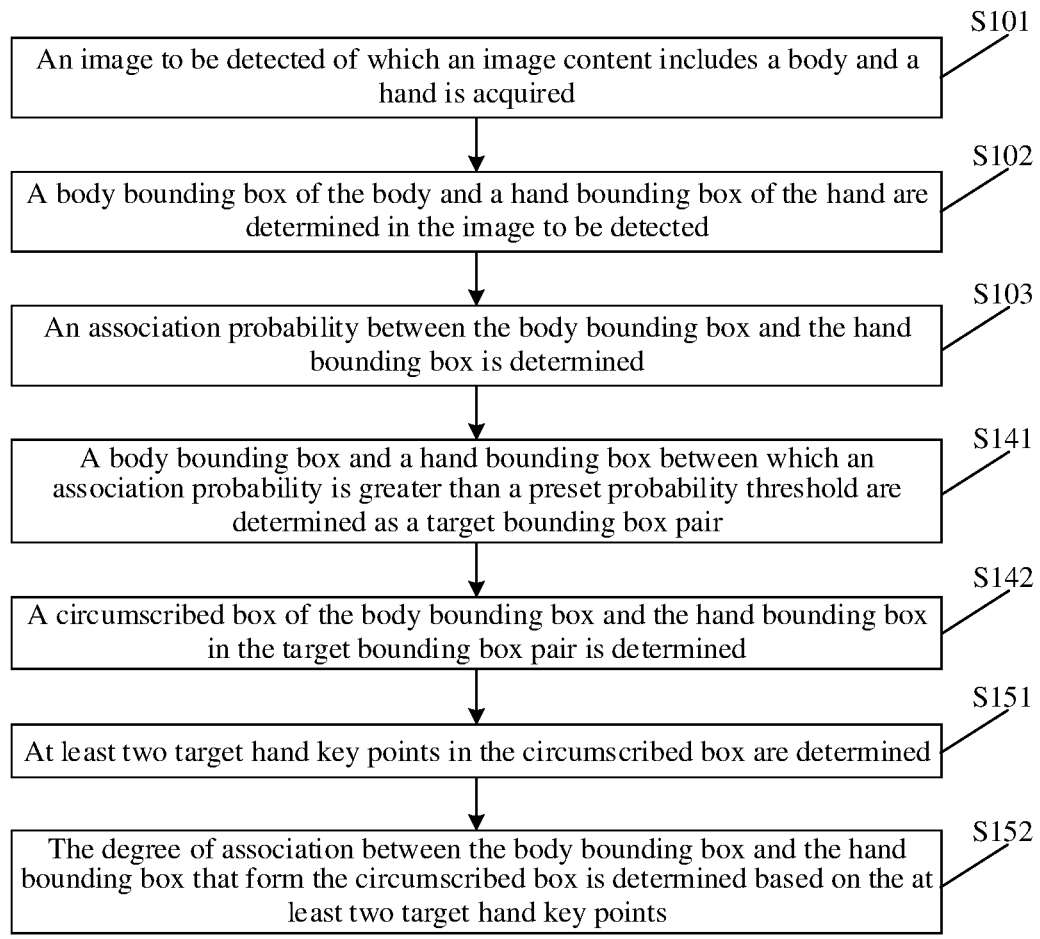
FIG. 2 is a flowchart of another body and hand association method according to an embodiment of the disclosure.

In a possible implementation mode, a body bounding box and a hand bounding box between which an association probability is greater than the preset probability threshold form a target bounding box pair, and meanwhile, a candidate that may enclose the target bounding box pair is determined as a circumscribed box of the body bounding box and the hand bounding box. That is, S104 may be implemented through the following process. As shown in FIG. 2, FIG. 2 is a flowchart of another body and hand association method according to an embodiment of the disclosure. The following descriptions will be made in combination with the operations shown in FIG. 1 and FIG. 2.

In S141, a body bounding box and a hand bounding box between which an association probability is greater than a preset probability threshold are determined as a target bounding box pair.

In some embodiments, the preset probability threshold is determined based on practical applications, or may be determined based on attribute information of the image to be detected, or may be determined based on the body feature of the body bounding box and the hand feature of the hand bounding box. The preset probability threshold may be 90%, 85%, 88%, etc. Correspondingly, the preset probability threshold may be represented as a fraction, a decimal, and a percentage. Each target bounding box pair includes a body bounding box and a hand bounding box, and an association probability between the body bounding box and the hand bounding box is greater than the preset probability threshold.

In S142, a circumscribed box of the body bounding box and the hand bounding box in the target bounding box pair is determined.

In some embodiments, the circumscribed box may refer to a minimum rectangular box that may completely enclose the body bounding box and the hand bounding box in the target bounding box pair. In a case that the preset probability threshold is 90%, the association probability between the body bounding box and the hand bounding box in the circumscribed box is greater than 90%.

In some embodiments, the target bounding box pair formed by the body bounding box and the hand bounding box is screened based on the association probability to further obtain the circumscribed box of the body bounding box and the hand bounding box in the target bounding box pair. As such, a circumscribed box of a body bounding box and a hand bounding box between which a degree of association is relatively high may be determined efficiently and accurately.

In some possible implementation modes, the operation that the circumscribed box of the body bounding box and the hand bounding box in the target bounding box pair is determined, i.e., S142, may be implemented through the following process. The following descriptions will be continued in combination with the operations shown in FIG. 1 and FIG. 2.

At block 1, a candidate box that encloses the target bounding box pair is determined.

In some embodiments, in a case that the association probability is greater than the preset probability threshold, the body bounding box and the hand bounding box are combined based on a relative positional relationship between the body bounding box and the hand bounding box to obtain the candidate box that may enclose the target bounding box pair, i.e., the candidate box that may enclose the body bounding box and the hand bounding box. A size and shape of the candidate box are not limited in the embodiment of the disclosure.

In some embodiments, in a case that multiple body bounding boxes and multiple hand bounding boxes are determined, and association probabilities are greater than the preset probability threshold, a first body bounding box is combined with a first right hand bounding box to obtain a first target bounding box pair, and a first candidate box that may enclose the first target bounding box pair is determined. In some possible implementation modes, the first body bounding box is combined with a second right hand bounding box to obtain a second target bounding box pair, and a second candidate box that may enclose the second target bounding box pair is determined. A second body bounding box is combined with a third right hand bounding box to obtain a third target bounding box pair, and a third candidate box that may enclose the third target bounding box pair, etc., are determined. The second body bounding box is combined with a second left hand bounding box to obtain a fourth target bounding box pair, and a fourth candidate box that may enclose the fourth target bounding box pair, etc., are determined.

At block 2, a cover area of the candidate box is adjusted based on a relative positional relationship between the body bounding box and the hand bounding box in the target bounding box pair to obtain the circumscribed box.

In some embodiments, the cover area of the candidate box is adjusted based on the relative positional relationship between the body bounding box and the hand bounding box in the target bounding box pair to obtain the circumscribed box. The circumscribed box is a minimum rectangular box that may enclose the body bounding box and the hand bounding box. Exemplarily, adjusting the cover area of the candidate box includes, but not limited to, correspondingly reducing the cover area of the candidate box according to the shape of the candidate box, reducing the cover area according to body information in the candidate box, etc. As such, a more accurate circumscribed box may be determined rapidly and efficiently to improve the accuracy of determining the association between the body bounding box and the hand bounding box that form the circumscribed box based on the hand key point in the more accurate circumscribed box.

Based on the above descriptions, it can be seen that the association probability between the body bounding box and the hand bounding box in the circumscribed box is greater than the preset probability threshold. Therefore, there is a certain association between the body and hand in the circumscribed box, namely there may not be any circumscribed box where a numerical value corresponding to an association degree between a body bounding box and a hand bounding box is 0.

In some possible implementation modes, at least two target hand key points in the circumscribed box and the association probability are determined to determine the degree of association between the body bounding box and the hand bounding box that form the circumscribed box. That is, S105 may be implemented through the following process. The following descriptions will be continued in combination with the operations shown in FIG. 1 and FIG. 2.

In S151, at least two target hand key points in the circumscribed box are determined.

The at least two target hand key points include key points that belong to two different hands of a same person respectively.

In some embodiments, the at least two target hand key points in the circumscribed box may refer to the key points that belong to the two different hands of the same person respectively in the circumscribed box. The key points that belong to the two different hands of the same person respectively may be at any positions in the circumscribed box. As such, the at least two target hand key points in the circumscribed box may be determined to reduce errors possibly generated when the degree of association is judged by detecting only one hand key point.

In some embodiments, the at least two target hand key points in the circumscribed box may be determined through an HKD model.

In a possible implementation mode, the target hand key point includes a wrist key point.

In some embodiments, in a case that the target hand key point includes the wrist key point, the at least two target hand key points in the circumscribed box may be wrist key points that belong to the two different hands of the same person respectively in the circumscribed box. In the following embodiments of the disclosure, the target hand key point refers to the wrist key point.

In some embodiments, the hand key point is determined to be the wrist key point. As such, a more accurate detection parameter may be provided, and furthermore, the detection accuracy may be improved.

In S152, the degree of association between the body bounding box and the hand bounding box that form the circumscribed box is determined based on the at least two target hand key points.

In some embodiments, the degree of association between the body bounding box and the hand bounding box that form the circumscribed box is determined based on key points of different wrists, such as a key point of a right wrist and a key point of a left wrist. In this manner, on the premise that whether the hand bounding box that forms the circumscribed box is a left hand bounding box or a right hand bounding box cannot be determined, the key point of the left wrist and the key point of the right wrist are simultaneously detected, so that errors possibly generated when the degree of association is judged by detecting the key point of only one wrist may be reduced, namely the key points of the wrists in the circumscribed box may be comprehensively detected to further improve the accuracy in association of the body bounding box and the hand bounding box that form the circumscribed box.

Figure 3A:
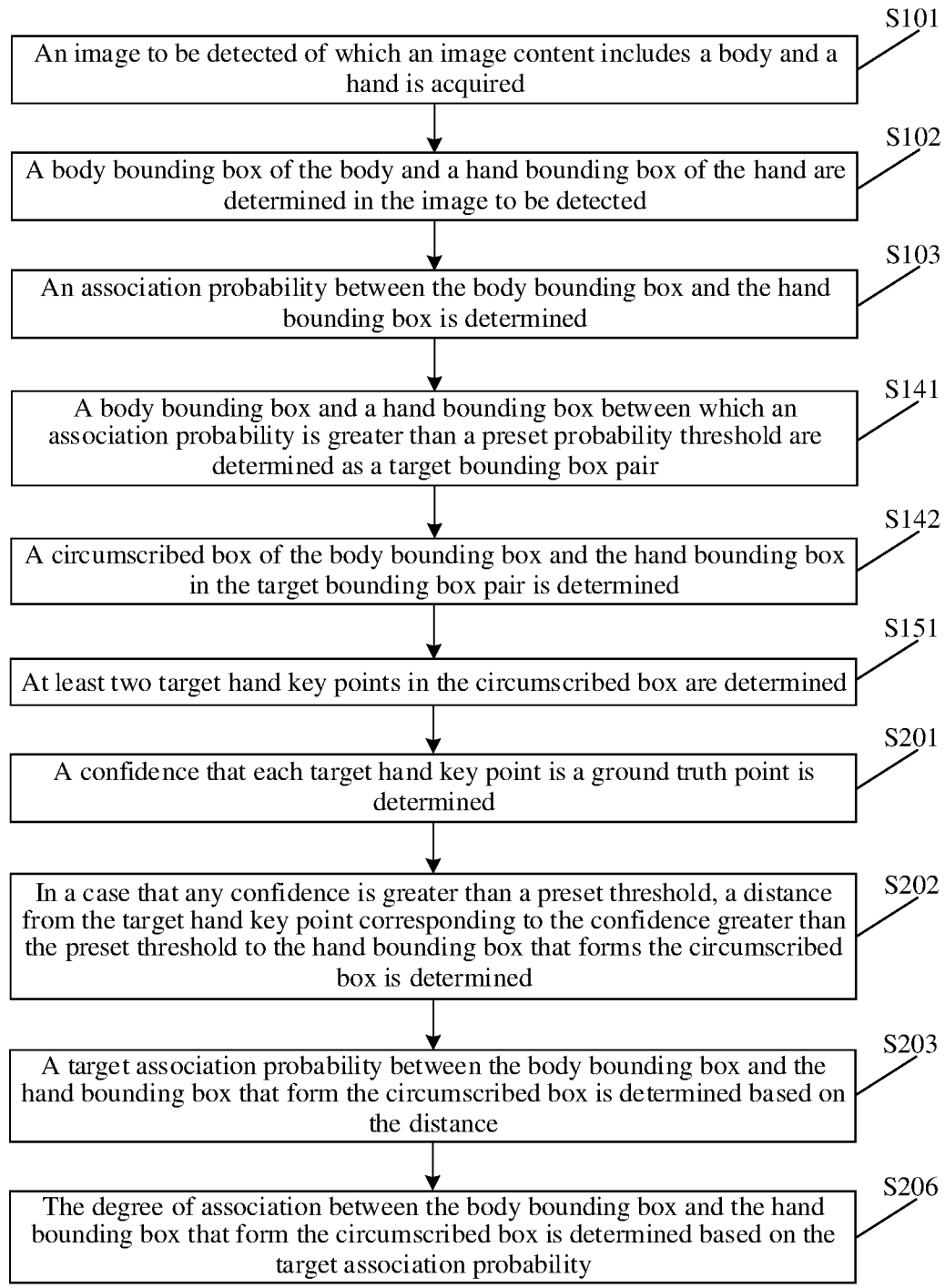
FIG. 3A is a flowchart of another body and hand association method according to an embodiment of the disclosure.
Figure 3B:
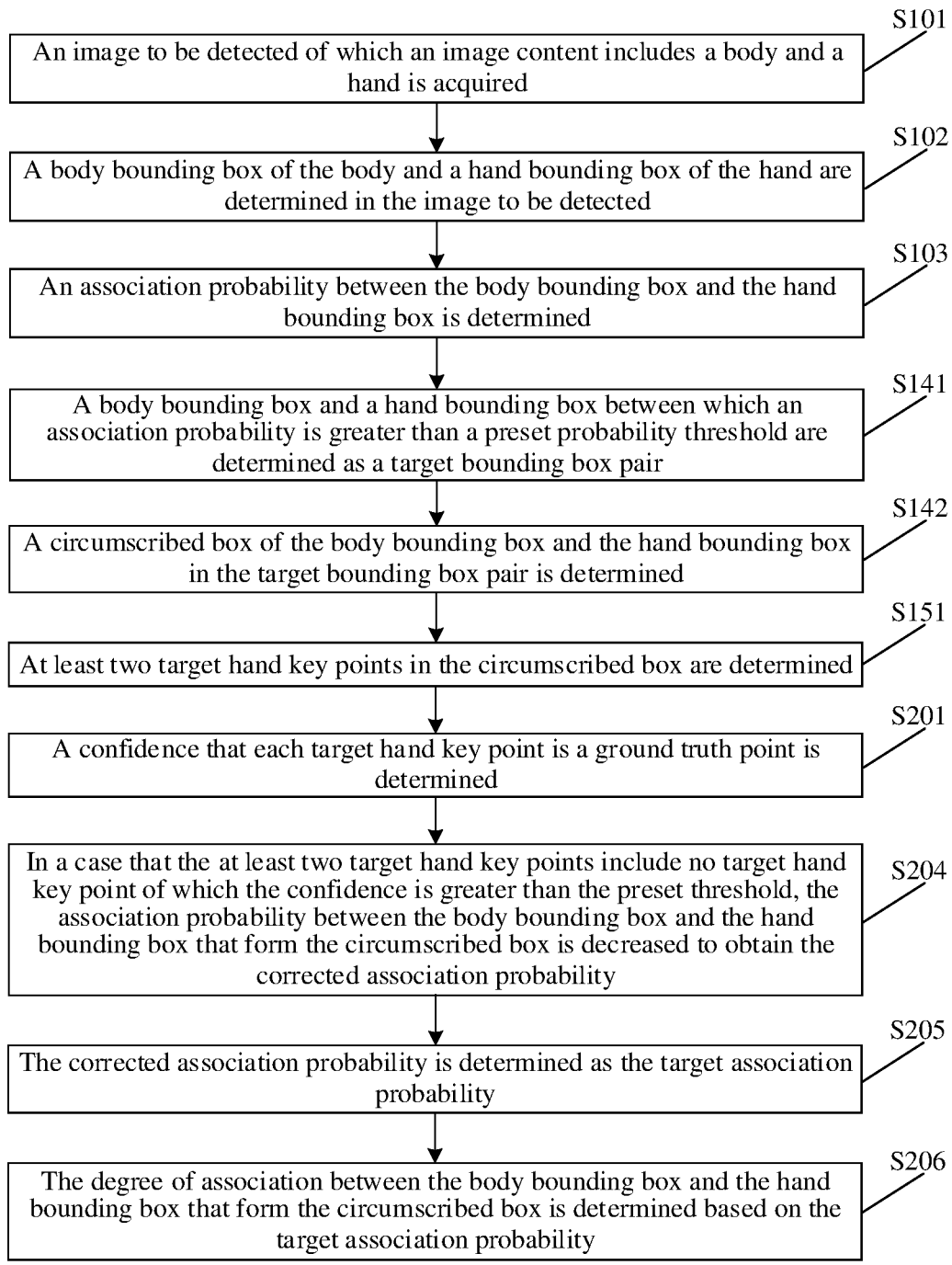
FIG. 3B is a flowchart of another body and hand association method according to an embodiment of the disclosure.

In some embodiments, the operation that the degree of association between the body bounding box and the hand bounding box that form the circumscribed box is determined based on the at least two target hand key points, i.e., the key points of different wrists, i.e., S152, may be implemented through the following operations. As shown in FIG. 3, FIG. 3 is a flowchart of another body and hand association method according to an embodiment of the disclosure. The following descriptions will be made in combination with the operations shown in FIG. 1 to FIG. 3.

In S201, a confidence that each target hand key point is a ground truth point is determined.

In some embodiments, a confidence that each wrist key point is a ground truth point is determined. The ground truth point may refer to information that each wrist key point in the circumscribed box is ground truth, i.e., a true value. Exemplarily, it may indicate that, under a certain condition, the ground truth point is an objective true value after measurement in the circumscribed box. The confidence that each wrist key point is a ground truth point may be acquired from the image to be detected through the image feature extraction model or the target detection algorithm.

In some embodiments, the confidence that each wrist key point is a ground truth point may refer to a confidence level that each wrist key point is a ground truth point. Exemplarily, if a confidence interval at a confidence level 0.95 that the right wrist key point is a ground truth point is (0.5, 0.6), a confidence that the right wrist key point is a ground truth point is 50% to 60% at a probability of 95%.

In some embodiments, the confidence that each target hand key point in the circumscribed box is a ground truth point may refer to a confidence that the left wrist key point is a ground truth point and the confidence that the right wrist key point is a ground truth point.

In a possible implementation mode, the confidence that the target hand key point is a ground truth point is judged to determine the target association probability between the body bounding box and the hand bounding box that form the circumscribed box. There may be two conditions.

In a case that any confidence is greater than a preset threshold, following S202, S203 and S206 are executed. The following descriptions will be made in combination with the operations in FIG. 1, FIG. 2, and FIG. 3A.

In a case that not confidence is greater than the preset threshold, following S204 to S206 are executed. The following descriptions will be made in combination with the operations in FIG. 1, FIG. 2, and FIG. 3B.

In S202, in a case that any confidence is greater than a preset threshold, a distance from the target hand key point corresponding to the confidence greater than the preset threshold to the hand bounding box that forms the circumscribed box is determined.

In some embodiments, a representation form of the preset threshold forms a mapping relationship with a representation form of the confidence. The preset threshold may be set according to requirements on a resolution and/or recognizability of the wrist key point. For example, if the requirements on the resolution and recognizability of the wrist key point are higher, the preset threshold is set to be greater. Exemplarily, the preset threshold may be set to 0.85. In a case that the confidence is greater than the preset threshold, the distance from the wrist key point corresponding to the confidence greater than the preset threshold to the hand bounding box that forms the circumscribed box is determined. The distance may be a distance from each wrist key point to a center point of the hand bounding box that forms the circumscribed box, or may be a distance from each wrist key point to any joint of the hand in the hand bounding box that forms the circumscribed box, or may be a distance from each wrist key point to a center point of the hand in the hand bounding box that forms the circumscribed box, or may be a distance from each wrist key point to a boundary region of the hand bounding box that forms the circumscribed box.

In a possible implementation mode, first distances and second distances from different wrist key points to the hand bounding box that forms the circumscribed box may be determined to further determine the degree of association between the body bounding box and the hand bounding box that form the circumscribed box based on the first distances and/or the second distances. That is, in a case that different wrist key points include a first key point of a first wrist and a second key point of a second wrist, and the distance includes a first distance and a second distance, S202 may be implemented through the following process.

At block 1, in a case that a confidence corresponding to the first key point is greater than the preset threshold, a first distance from the first key point to the hand bounding box that forms the circumscribed box is determined.

In some embodiments, in a case that the confidence corresponding to the first key point of the first wrist is greater than the preset threshold, the first distance from the first key point to the hand bounding box that forms the circumscribed box is determined. The first wrist may refer to any one of the left and right wrists of the body in the circumscribed box. It is assumed that the first wrist is the left wrist, and the second wrist is correspondingly the right wrist. It is assumed that the first wrist is the right wrist, and the second wrist is correspondingly the left wrist.

In some embodiments, if the first wrist refers to the right wrist, in a case that the confidence corresponding to the first key point of the right wrist is greater than the preset threshold, it may be determined that the first distance is a distance from the first key point of the right wrist to the boundary region of the hand bounding box that forms the circumscribed box, or a distance from the first key point of the right wrist to the center point of the hand bounding box that forms the circumscribed box, or a distance from the first key point of the right wrist to any joint of the hand in the hand bounding box that forms the circumscribed box, or the distance from the first key point of the right wrist to the boundary region of the hand bounding box that forms the circumscribed box, etc.

At block 2, in a case that a confidence corresponding to the second key point is greater than the preset threshold, a second distance from the second key point to the hand bounding box that forms the circumscribed box is determined.

In some embodiments, in a case that the confidence corresponding to the second key point of the second wrist is greater than the preset threshold, the second distance from the second key point to the hand bounding box that forms the circumscribed box is determined. Exemplarily, if the second wrist is the left wrist, the second distance may be a distance from the second key point of the left wrist to the boundary region of the hand bounding box that forms the circumscribed box, or a distance from the second key point of the left wrist to the center point of the hand bounding box that forms the circumscribed box, or a distance from the second key point of the left wrist to any joint of the hand in the hand bounding box that forms the circumscribed box, or the distance from the second key point of the left wrist to the boundary region of the hand bounding box that forms the circumscribed box, etc. The first distance may be the same as or different from the second distance.

In some embodiments, the confidences and related distances corresponding to the first key point of the first wrist and the second key point of the second wrist are judged respectively, so that the accuracy of determining the target association probability based on the distance may further be improved on the premise of providing a more accurate distance reference parameter.

In S203, a target association probability between the body bounding box and the hand bounding box that form the circumscribed box is determined based on the distance.

In some embodiments, the target association probability between the body bounding box and the hand bounding box that form the circumscribed box is determined based on the distance from each wrist key point to the hand bounding box that forms the circumscribed box. The target association probability may be the same as or different from the determined association probability between the body bounding box and the hand bounding box that form the circumscribed box.

In some embodiments, adjusting, based on the distance, the association probability between the body bounding box and the hand bounding box that form the circumscribed box may be increasing, decreasing, or keeping the association probability between the body bounding box and the hand bounding box that form the circumscribed box, to further obtain the target association probability.

In a possible implementation mode, the distance is judged to determine the target association probability between the body bounding box and the hand bounding box of the circumscribed box. That is, implementation of S203 may be divided into two conditions based on the distance.

A first condition may be implemented through following S231 and S232.

In S231, in a case that the distance is less than or equal to a preset distance, the association probability between the body bounding box and the hand bounding box that form the circumscribed box is determined to obtain an in-box association probability.

In some embodiments, a numerical value of the distance is judged, and in a case that the distance is less than or equal to the preset distance, the association probability between the body bounding box and the hand bounding box that form the circumscribed box is calculated to obtain the corresponding in-box association probability. Exemplarily, the in-box association probability may be an original association probability between the body bounding box and the hand bounding box that form the circumscribed box. Alternatively, the in-box association probability may be obtained by adaptively increasing the original association probability between the body bounding box and the hand bounding box that form the circumscribed box.

In S232, the in-box association probability is determined as the target association probability.

In some embodiments, determining the in-box association probability as the target association probability may be directly determining the in-box association probability as the target association probability. Exemplarily, it is assumed that the in-box association probability is the original association probability between the body bounding box and the hand bounding box that form the circumscribed box, namely the in-box association probability is greater than the preset probability threshold. Alternatively, the in-box association probability may be adaptively adjusted, for example, the in-box association probability is increased, and the increased in-box association probability is determined as the target association probability. In this manner, the numerical value of the distance may be judged to determine the target association probability between the body bounding box and the hand bounding box rapidly and conveniently, and meanwhile, unnecessary calculations may be reduced.

A second condition may be implemented through following S233 and S234.

In S233, in a case that the distance is greater than the preset distance, the association probability between the body bounding box and the hand bounding box that form the circumscribed box is decreased to obtain a corrected association probability.

In some embodiments, the numerical value of the distance is judged, and in a case that the distance is greater than the preset distance, the association probability between the body bounding box and the hand bounding box that form the circumscribed box is decreased. Exemplarily, in a case that the distance is greater than the preset distance, the association probability between the body bounding box and the hand bounding box that form the circumscribed box is lowered to obtain the corrected association probability. The original association probability between the body bounding box and the hand bounding box that form the circumscribed box may be decreased, namely the corrected association probability may be the same as, or less than, or greater than a preset association probability.

In some embodiments, a parameter that correction of the association probability between the body bounding box and the hand bounding box that form the circumscribed box depends on may be constant, or may be dynamically changed based on an absolute difference between the distance and the preset distance.

In a possible implementation mode, the association probability between the body bounding box and the hand bounding box that form the circumscribed box may be corrected through a preset adjustment parameter. That is, S233 may be implemented through the following operations.

At block 1, in the case that the distance is greater than the preset distance, a preset adjustment parameter configured to adjust the association probability is acquired.

In some embodiments, in a case that the distance is greater than the preset distance, the preset adjustment parameter configured to adjust the association probability is acquired. The preset adjustment parameter may be a constant, and a corresponding representation form may be a decimal, a fraction, a percentage, etc. The numerical representation form corresponding to the preset adjustment parameter forms corresponding relationship with the numerical representation form corresponding to the association probability. The preset adjustment parameter may be 1, 0.4, 5%, etc.

In some embodiments, the preset adjustment parameter configured to correct the association probability may be determined based on the distances from the left wrist key point and/or the right wrist key point to the hand bounding box that forms the circumscribed box, or may be determined based on attribute information of the circumscribed box, or may be determined based on a size parameter of the hand bounding box that forms the circumscribed box, or may be determined based on the size of the hand in the hand bounding box that forms the circumscribed box, the size of the body in the body bounding box that forms the circumscribed box, etc.

At block 2, the association probability between the body bounding box and the hand bounding box that form the circumscribed box is lowered using the preset adjustment parameter to obtain the corrected association probability.

In some embodiments, the association probability between the body bounding box and the hand bounding box that form the circumscribed box is lowered using the preset adjustment parameter. Exemplarily, the preset adjustment parameter may be subtracted from the association probability between the body bounding box and the hand bounding box that form the circumscribed box. The preset adjustment parameter may be any positive number. Alternatively, the association probability between the body bounding box and the hand bounding box that form the circumscribed box may be divided by the preset adjustment parameter to obtain the corrected association probability. The preset adjustment parameter may be any positive integer.

The corrected association probability is lower than the original association probability between the body bounding box and the hand bounding box that form the circumscribed box. The corrected association probability may be greater than the preset association probability, or may be less than or equal to the preset association probability. In this manner, the related association probability is decreased through the preset adjustment parameter to obtain the corrected association probability, so that the corrected association probability may be determined rapidly and conveniently, and furthermore, the accuracy of determining the association between the body bounding box and the hand bounding box in the circumscribed box may be improved.

In S234, the corrected association probability is determined as the target association probability.

In some embodiments, the corrected association probability may be directly determined as the target association probability. In this manner, the numerical value of the distance may be judged to adjust the related parameter rapidly and conveniently to determine the target association probability between the body bounding box and the hand bounding box, and meanwhile, unnecessary calculations may be reduced.

In S204, in a case that the at least two target hand key points include no target hand key point of which the confidence is greater than the preset threshold, the association probability between the body bounding box and the hand bounding box that form the circumscribed box is decreased to obtain the corrected association probability.

In some embodiments, in a case that the right wrist key point and the left wrist key point include no key point of which the confidence is greater than the preset threshold, the association probability between the body bounding box and the hand bounding box that form the circumscribed box is lowered or decreased to obtain the corrected association probability.

In S205, the corrected association probability is determined as the target association probability.

In some embodiments, in a case of determining that the target hand key points include no target hand key point of which the confidence is greater than the preset threshold, the association probability between the body bounding box and the hand bounding box that form the circumscribed box is decreased, so that the accuracy in association of the body bounding box and the hand bounding box that form the circumscribed box may further be improved.

In S206, the degree of association between the body bounding box and the hand bounding box that form the circumscribed box is determined based on the target association probability.

In some embodiments, the degree of association between the body bounding box and the hand bounding box that form the circumscribed box is determined based on the target association probability, namely based on the uncorrected in-box association probability or the corrected association probability. For example, if it is determined that the target association probability is 80%, the corresponding degree of association between the body bounding box and the hand bounding box that form the circumscribed box is relatively high. If it is determined that the target association probability is 60%, the corresponding degree of association between the body bounding box and the hand bounding box that form the circumscribed box is relatively low. If it is determined that the target association probability is 90%, the corresponding degree of association between the body bounding box and the hand bounding box that form the circumscribed box is quite high. In this manner, if the confidence that the wrist key point is a ground truth point is greater than the preset threshold, the association probability between the body bounding box and the hand bounding box that form the circumscribed box is adaptively adjusted based on the distance from the wrist key point to the hand bounding box that forms the circumscribed box, or if the confidence is less than or equal to the preset threshold, the association probability between the body bounding box and the hand bounding box that form the circumscribed box is decreased, so that the accuracy in association of the body bounding box and the hand bounding box that form the circumscribed box may further be improved.

In a possible implementation mode, in a case of determining multiple body bounding boxes and/or multiple hand bounding boxes in the image to be detected, in the body and hand association method, a matching relationship between the body and hand in the related circumscribed box may further be determined through the following process.

At block 1, each detected body bounding box is combined with each detected hand bounding box to obtain multiple bounding box pairs.

In some embodiments, it is assumed that two body bounding boxes and three hand bounding boxes are determined in the image to be detected, and six bounding box pairs are obtained based on each detected body bounding box and each detected hand bounding box, such as body bounding box 1-hand bounding box 1, body bounding box 1-hand bounding box 2, body bounding box 1-hand bounding box 3, body bounding box 2-hand bounding box 1, body bounding box 2-hand bounding box 2, and body bounding box 2-hand bounding box 3.

At block 2, a circumscribed box of the body bounding box and the hand bounding box in each bounding box pair is determined.

In some embodiments, block 2 corresponds to S104 provided in the body and hand association method, namely the circumscribed boxes of the body bounding boxes and the hand bounding boxes are determined.

In some embodiments, the circumscribed box of the body bounding box and each hand bounding box in each bounding box pair is determined. Each circumscribed box may be obtained by combining the body bounding box of each body and the hand bounding box of each hand. Exemplarily, the body bounding box of each body and the hand bounding box of each hand may be determined at first. Then, an association probability between each body bounding box and each hand bounding box is calculated. In a case that the association probability is greater than the preset probability threshold, the body bounding box and the hand bounding box consistent with a certain condition are combined to form the circumscribed box.

In some embodiments, a specific size and shape of the circumscribed box of each body bounding box and each hand bounding box may be determined based on the body bounding box of each body and the hand bounding box of each hand.

In some embodiments, each body may correspond to multiple circumscribed boxes. Exemplarily, each body bounding box at least forms two corresponding circumscribed boxes with two hand bounding boxes, such as the right hand bounding box and the right hand bounding box. In addition, each hand bounding box may correspond to one, two or more than two circumscribed boxes, etc.

After block 1 and block 2 are executed, S105 provided in the body and hand association method, i.e., the following operation, may be executed.

At block 3, a degree of association between a body and hand in each circumscribed box is determined to obtain a set of target degrees of association.

In some embodiments, the degree of association between the body and hand in each circumscribed box is calculated and determined. The target degree of association may be determined based on different hand key points in each circumscribed box, or may be determined based on different wrist key points in each circumscribed box. Exemplarily, the target degree of association may be determined based on a confidence that each wrist key point in each circumscribed box is a ground truth point and a distance from each wrist key point to the hand bounding box that forms the circumscribed box. Details of a related implementation solution may refer to the descriptions about determining the target association probability of the circumscribed box in the abovementioned embodiments, and elaborations are omitted herein.

At block 4, a candidate degree of association greater than a preset association degree threshold is determined in the set of target degrees of association.

In some embodiments, screening the degree of associations in the set of target degrees of association based on the preset association degree threshold may be screening the degree of associations in the set of target degrees of association based on the preset association degree threshold to determine the corresponding candidate degree of association, or may be screening the degree of associations in the set of target degrees of association based on a parameter less than the preset association degree threshold to determine the corresponding candidate degree of association.

At block 5, based on a target circumscribed box corresponding to the candidate degree of association, a hand matching a body in the target circumscribed box is determined.

In some embodiments, the hand is determined based on the target circumscribed box corresponding to the candidate degree of association. The target circumscribed box may include two circumscribed boxes formed by each body and two corresponding hand bounding boxes, such as the left hand bounding box and the right hand bounding box, or may include multiple circumscribed boxes formed by each body and multiple corresponding hand bounding boxes, such as multiple left hand bounding boxes and/or multiple right hand bounding boxes. In this manner, a candidate degree of association consistent with a certain condition is screened based on the target degree of association corresponding to the circumscribed box formed by each body and each hand, and the hand matching each body is further determined, so that a more accurate body and hand matching relationship may be determined based on the optimized degree of association.

In some embodiments, first body A corresponds to three target circumscribed boxes, i.e., circumscribed box A1 formed by first body A and a first hand, corresponding to a candidate degree of association of 90%, circumscribed box A2 formed by first body A and a second hand, corresponding to a candidate degree of association of 99%, and circumscribed box A3 formed by the first body and a third hand, corresponding to a candidate degree of association of 70% respectively. Second body B corresponds to four target circumscribed boxes, i.e., circumscribed box B1 formed by second body B and the first hand, corresponding to a candidate degree of association of 60%, circumscribed box B2 formed by second body B and the second hand, corresponding to a candidate degree of association of 70%, circumscribed box B3 formed by second body B and a fourth hand, corresponding to a candidate degree of association of 99%, and circumscribed box B4 formed by second body B and a fifth hand, corresponding to a candidate degree of association of 95%. In the embodiment of the disclosure, the above parameters are calculated based on a greedy algorithm, a Kuhn and Munkres (KM) algorithm, etc., to determine the hand matching each body. For example, a calculation result may be that the hand matching first body A is the second hand, and the hand matching second body B is the fourth hand and the fifth hand.

The body and hand association method will be described below in combination with a specific embodiment. However, it is to be noted that the specific embodiment is only for describing the embodiments of the disclosure better and does not form improper limits to the embodiments of the disclosure.

In a complex scene with many people, such as a game place, there is usually such a phenomenon that persons are occluded by one another or arms are crossed. In addition, there are many bodies in a field of view, and a crossing condition of corresponding arms is usually relatively complex. In the related art, a body and hand detection and association algorithm is used to predict an association probability between each pair of body and hand, or HKD is used to detect a hand key point of each body, and meanwhile, another sensor is combined to judge a person that a hand belongs to. It is difficult for the body and hand detection and association algorithm to deal with conditions that hands are stretched out, arms are crossed, etc. An HKD model corresponding to the body and hand detection and association algorithm depends much on the accuracy of a body bounding box. If the body bounding box is inaccurate, and does not include any hand, the HKD model may output an incorrect result. Moreover, when HKD is used to detect a hand key point of each body, a position and size of the whole hand cannot be obtained, and meanwhile, the other sensor is required to be combined to judge the person that the hand belongs to, so the judgment accuracy cannot be ensured, and the judgment cost is relatively high.

Figure 4:
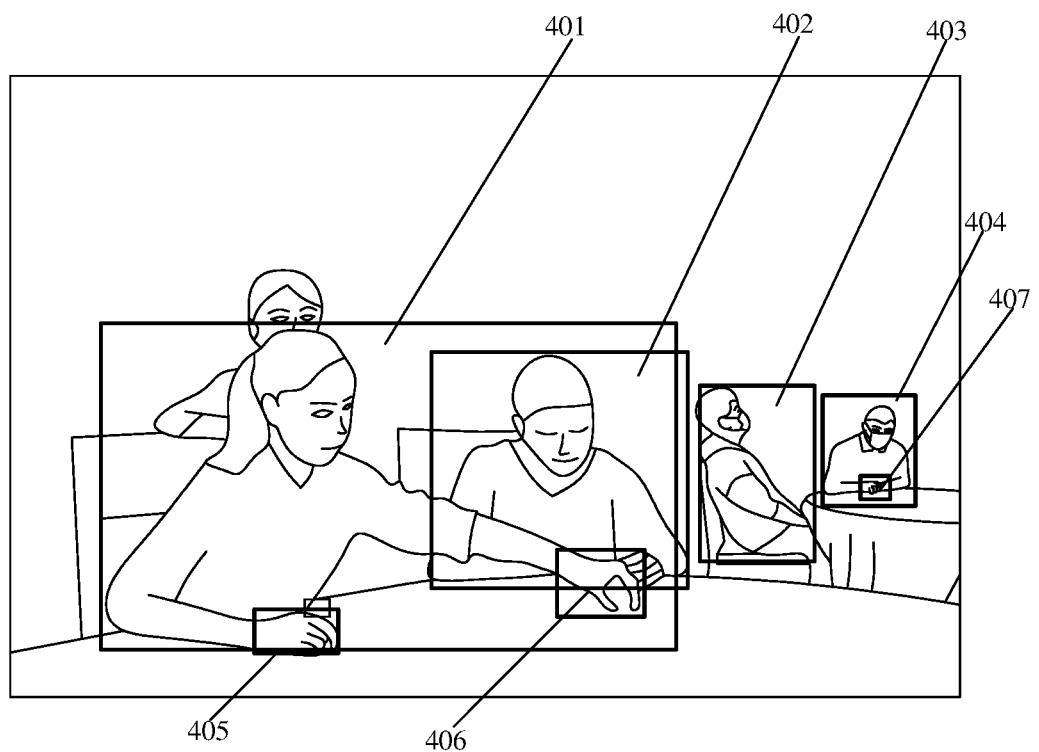
FIG. 4 is a schematic diagram of an application scene of a body and hand association method according to an embodiment of the disclosure.

Based on this, the embodiment of the disclosure provides a body and hand association method. In a game place, a more accurate body and hand matching relationship may be determined through the body and hand association method provided in the embodiment of the disclosure. As shown in FIG. 4, a schematic diagram of an application scene of a body and hand association method according to an embodiment of the disclosure is shown. A method for correlating each body with each hand in FIG. 4 may be implemented through the following operations.

At block 1, all body bounding boxes and hand bounding boxes in FIG. 4 are predicted using a detection model. As shown in FIG. 4, multiple body bounding boxes with face information are presented. Correspondingly, the body bounding box is body, and the hand bounding box is hand. In addition, a face bounding box is face, and a card bounding box is chip. Exemplarily, 401, 402, 403, and 404 are bodies in an image to be detected respectively, and 405, 406, and 407 are hands.

At block 2, an association probability between the body bounding box of each body and the hand bounding box of each hand, which are determined in block 1, is calculated.

At block 3, a circumscribed box of a body bounding box and a hand bounding box between which the association probability is greater than a preset probability threshold is determined.

At block 4, the obtained circumscribed box is input to ah HKD model, and is detected to obtain information of at least two target hand key points in each circumscribed box, such as a confidence that each target hand key point is a ground truth point, and a distance from the target hand key point corresponding to a confidence greater than a preset threshold to the hand bounding box that forms the circumscribed box.

At block 5, taking a circumscribed box as an example for description, through a wrist key point in the circumscribed box, the wrist key point being a left wrist key point and right wrist key point that belong to the same person respectively, if confidences that the right wrist key point and the left wrist key point are ground truth points are greater than the preset threshold, namely the confidence corresponding to any one of x and y is greater than a certain preset threshold thres_kp, x and y representing a right wrist that is a ground truth point and a left wrist that is a ground truth point respectively, distances from x and y to the hand bounding box that forms the circumscribed box are determined. In a case that the distances are less than or equal to a preset distance, an uncorrected association probability is obtained without correcting an association probability between the body bounding box and the hand bounding box that form the circumscribed box. In a case that the distances are greater than the preset distance, the association probability between the body bounding box and the hand bounding box that form the circumscribed box is lowered to obtain a lowered association probability. In addition, when the confidence corresponding to any one of x and y is not greater than the certain preset threshold thres_kp, the association probability between the body bounding box and the hand bounding box that form the circumscribed box is lowered to obtain the lowered association probability. Moreover, as shown in FIG. 4, a confidence parameter corresponding to each bounding box is determined, such as face 1.00, hand 1.00, and hand 0.97.

At block 6, the body bounding boxes and hand bounding boxes in the circumscribed boxes corresponding to the obtained lowered association probability and uncorrected association probability are matched through a greedy algorithm or a KM algorithm to obtain the hand corresponding to each body.

In this manner, in the game place, a degree of association between the body and hand that form the circumscribed box is determined based on the hand key point in the circumscribed box and the association probability between the body bounding box and the hand bounding box that form the circumscribed box, so that the hand and body accuracy in association may be improved greatly.

In a specific example, the image to be detected is an image collected in the game place. The body is a player body, and the hand is a player hand. Through block 1 to block 6, first, an association probability between a body bounding box of each player body and a hand bounding box of each player hand is determined. Then, in a case that the association probability is greater than a preset probability threshold, the body bounding box of the player body is combined with the hand bounding box of the player hand to generate a circumscribed box. Next, through a hand key point in the circumscribed box, for example, a confidence that a wrist key point is a ground truth point is compared with a preset threshold. In a case that the confidence is greater than the preset threshold, a distance from each wrist key point to the hand bounding box of the circumscribed box is determined, and the association probability between the body bounding box and the hand bounding box in the circumscribed box is adaptively adjusted based on the distance. Alternatively, in a case that the confidence is less than or equal to the preset threshold, the association probability between the body bounding box and the hand bounding box that form the circumscribed box is decreased. Finally, the player hand corresponding to each player body is determined based on the association probability, namely the player body is paired with the player hand. As such, the player hand and body in the complex game place may be matched to monitor game currency placement or payment of the player or other processes in a game process more effectively.

In the embodiment of the disclosure, the degree of association between the body and hand in the circumscribed box is determined through the hand key point in the circumscribed box and the association probability between the body bounding box and the hand bounding box that form the circumscribed box, so that a facility for obtaining specific position information of a hand may be simplified, and meanwhile, the accuracy in association of the body bounding box and the hand bounding box in the circumscribed box may be improved.

Figure 5:
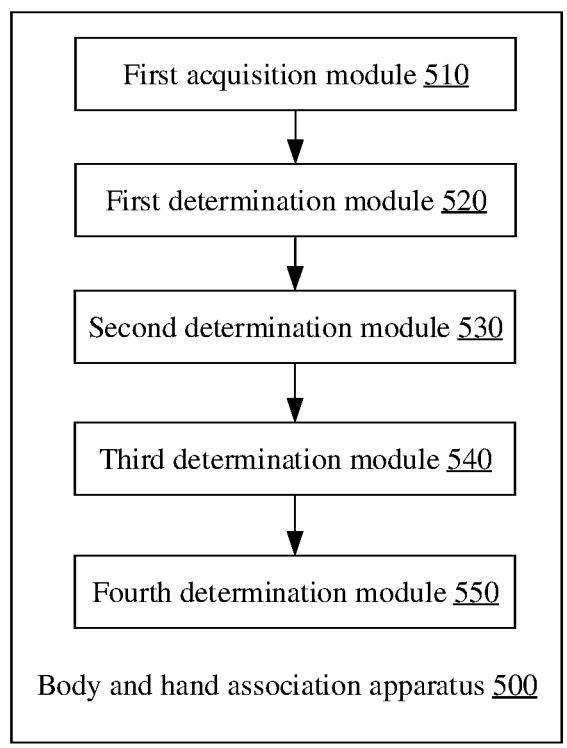
FIG. 5 is a composition structure diagram of a body and hand association apparatus according to an embodiment of the disclosure.

Based on the abovementioned embodiments, the embodiments of the disclosure provide a body and hand association apparatus. FIG. 5 is a composition structure diagram of a body and hand association apparatus according to an embodiment of the disclosure. As shown in FIG. 5, the body and hand association apparatus 500 includes a first acquisition module 510, a first determination module 520, a second determination module 530, a third determination module 540, and a fourth determination module 550.

The first acquisition module 510 is configured to acquire an image to be detected of which an image content includes a body and a hand.

The first determination module 520 is configured to determine a body bounding box of the body and a hand bounding box of the hand in the image to be detected.

The second determination module 530 is configured to determine an association probability between the body bounding box and the hand bounding box.

The third determination module 540 is configured to determine a circumscribed box of the body bounding box and the hand bounding box.

The fourth determination module 550 is configured to determine a degree of association between the body and hand in the circumscribed box based on a hand key point in the circumscribed box and the association probability.

In some embodiments, the second determination module 530 includes a feature determination sub-module 531 and an association probability determination sub-module 532.

The feature determination sub-module 531 is configured to determine a body feature of the body bounding box and a hand feature of the hand bounding box.

The association probability determination sub-module 532 is configured to determine the association probability between the body bounding box and the hand bounding box based on the body feature and the hand feature.

In some embodiments, the third determination module 540 includes a bounding box determination sub-module 541 and a circumscribed box determination sub-module 542.

The bounding box determination sub-module 541 is configured to determine, as a target bounding box pair, a body bounding box and a hand bounding box between which an association probability is greater than a preset probability threshold.

The circumscribed box determination sub-module 542 is configured to determine a circumscribed box of the body bounding box and the hand bounding box in the target bounding box pair.

In some embodiments, the circumscribed box determination sub-module 542 includes a candidate box determination subunit 5421 and a circumscribed box determination subunit 5422.

The candidate box determination subunit 5421 is configured to determine a candidate box that encloses the target bounding box pair.

The circumscribed box determination subunit 5422 is configured to adjust a cover area of the candidate box based on a relative positional relationship between the body bounding box and the hand bounding box in the target bounding box pair to obtain the circumscribed box.

In some embodiments, the fourth determination module 550 includes a hand key point determination sub-module 551 and an association degree determination sub-module 552.

The hand key point determination sub-module 551 is configured to determine at least two target hand key points in the circumscribed box, the at least two target hand key points including key points that belong to two different hands of a same person respectively.

The correlation degree determination sub-module 552 is configured to determine, based on the at least two target hand key points, the degree of association between the body bounding box and the hand bounding box that form the circumscribed box.

In some embodiments, the association degree determination sub-module 552 includes a confidence determination subunit 5521, a distance determination subunit 5522, an association probability determination subunit 5523, and an association degree determination subunit 5524.

The confidence determination subunit 5521 is configured to determine a confidence that each target hand key point is a ground truth point.

The distance determination subunit 5522 is configured to, in a case that any confidence is greater than a preset threshold, determine a distance from the target hand key point corresponding to the confidence greater than the preset threshold to the hand bounding box that forms the circumscribed box.

The association probability determination subunit 5523 is configured to determine, based on the distance, a target association probability between the body bounding box and the hand bounding box that form the circumscribed box.

The association degree determination subunit 5524 is configured to determine, based on the target association probability, the degree of association between the body bounding box and the hand bounding box that form the circumscribed box.

In some embodiments, the association probability determination subunit 5523 is further configured to, in a case that the distance is less than or equal to a preset distance, determine the association probability between the body bounding box and the hand bounding box that form the circumscribed box to obtain an in-box association probability, and determine the in-box association probability as the target association probability.

In some embodiments, the association probability determination subunit 5523 is further configured to, in a case that the distance is greater than the preset distance, decrease the association probability between the body bounding box and the hand bounding box that form the circumscribed box to obtain a corrected association probability, and determine the corrected association probability as the target association probability.

In some embodiments, the association probability determination subunit 5523 is further configured to, in the case that the distance is greater than the preset distance, acquire a preset adjustment parameter configured to adjust the association probability, and lower the association probability between the body bounding box and the hand bounding box that form the circumscribed box using the preset adjustment parameter to obtain the corrected association probability.

In some embodiments, the association probability determination subunit 5523 is further configured to, in a case that the at least two target hand key points include no target hand key point of which the confidence is greater than the preset threshold, decrease the association probability between the body bounding box and the hand bounding box that form the circumscribed box to obtain the corrected association probability, and determine the corrected association probability as the target association probability.

In some embodiments, the target hand key point includes a wrist key point.

In some embodiments, in a case of determining multiple body bounding boxes and/or multiple hand bounding boxes in the image to be detected, the bounding box determination subunit 541 is further configured to combine each detected body bounding box and each detected hand bounding box to obtain multiple bounding box pairs.

The circumscribed box determination sub-module 542 is further configured to determine a circumscribed box of the body bounding box and the hand bounding box in each bounding box pair.

The fourth determination module 550 is further configured to determine a degree of association between a body and hand in each circumscribed box to obtain a set of target degrees of association, determine a candidate degree of association greater than a preset association degree threshold in the set of target degrees of association, and based on a target circumscribed box corresponding to the candidate degree of association, determine a hand matching a body in the target circumscribed box.

It is to be pointed out that descriptions about the above apparatus embodiment are similar to descriptions about the method embodiment, and beneficial effects similar to those of the method embodiment are achieved. Technical details undisclosed in the apparatus embodiment of the disclosure may be understood with reference to the descriptions about the method embodiment of the disclosure.

It is to be noted that, in the embodiments of the disclosure, when implemented in form of a software function module and sold or used as an independent product, the body and hand association method may also be stored in a computer-readable storage medium. Based on such an understanding, the technical solutions of the embodiments of the disclosure substantially or parts making contributions to the related art may be embodied in form of software product. The computer software product is stored in a storage medium, including a plurality of instructions configured to enable an electronic device (which may be a smart phone with a camera, a tablet computer, etc.) to execute all or part of the method in each embodiment of the disclosure. The storage medium includes various media capable of storing program codes such as a U disk, a mobile hard disk, a Read Only Memory (ROM), a magnetic disk, or an optical disk. Therefore, the embodiments of the disclosure are not limited to any specific hardware and software combination.

Figure 6:
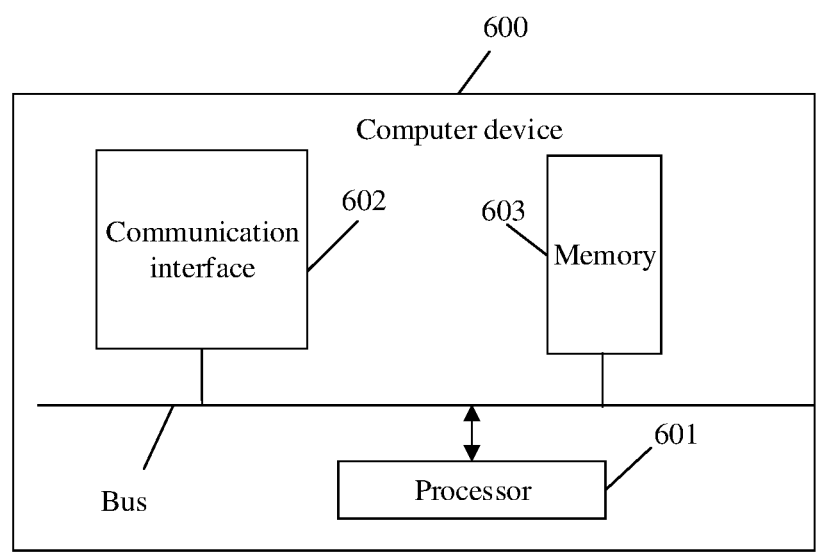
FIG. 6 is a composition structure diagram of a computer device according to an embodiment of the disclosure.

Based on the same technical concept, the embodiments of the disclosure provide a computer device, which is configured to implement a body and hand association method recorded in the method embodiment. FIG. 5 is a composition structure diagram of a computer device according to an embodiment of the disclosure. As shown in FIG. 6, the computer device 600 includes a processor 601, at least one communication bus, a communication interface 602, at least one external communication interface, and a memory 603. The communication interface 602 is configured to implement connections and communications between these components. The communication interface 602 may include a display screen, and the external communication interface may include a standard wired interface and wireless interface. The processor 601 is configured to execute a body and hand association program in the memory to implement the body and hand association method provided in the abovementioned embodiments.

Correspondingly, the embodiments of the disclosure provide a computer-readable storage medium, in which a computer program is stored, the computer program being executed by a processor to implement the steps in any body and hand association method as described in the abovementioned embodiment.

Correspondingly, there is also provided a chip in the embodiments of the disclosure. The chip includes a programmable logic circuit and/or a program instruction. The chip, when running, is configured to implement the steps in any body and hand association method as described in the abovementioned embodiments.

Correspondingly, there is also provided a computer program product in the embodiments of the disclosure. The computer program product, when executed by a processor of an electronic device, is configured to implement the steps in any body and hand association method as described in the abovementioned embodiments.

The above descriptions about the embodiments of the body and hand association apparatus, the computer device, and the storage medium are similar to the descriptions about the method embodiments, and technical descriptions and beneficial effects are similar to those of the corresponding method embodiments. Due to the space limitation, references can be made to the records in the method embodiments, and elaborations are omitted herein. Technical details undisclosed in the embodiments of the body and hand association apparatus, computer device, and storage medium in the embodiments of the disclosure may be understood with reference to the descriptions about the method embodiments of the disclosure.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" mentioned throughout the specification does not always refer to the same embodiment. In addition, these specific features, structures or characteristics may be combined in one or more embodiments freely as appropriate. It is to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure. The sequence numbers of the embodiments of the disclosure are adopted not to represent superiority-inferiority of the embodiments but only for description. It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. In a case of no more limitations, an element defined by the statement "including a/an" does not exclude existence of the same other elements in a process, method, object or device including the element.

In some embodiments provided by the disclosure, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each function unit in each embodiment of the disclosure may be integrated into a processing unit, each unit may also serve as an independent unit and two or more than two units may also be integrated into a unit. The integrated unit may be implemented in a hardware form and may also be implemented in form of hardware and software function unit. Those of ordinary skill in the art should know that all or part of the steps of the method embodiment may be implemented by related hardware instructed through a program, the program may be stored in a computer-readable storage medium, and the program is executed to execute the steps of the method embodiment. The storage medium includes: various media capable of storing program codes such as a mobile storage device, a ROM, a magnetic disk, or an optical disc.

Or, when being implemented in form of software function module and sold or used as an independent product, the integrated unit of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a mobile hard disk, a ROM, a magnetic disk, or an optical disc. The above is only the specific implementation mode of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the embodiments of the disclosure. Therefore, the scope of protection of the embodiments of the disclosure shall be subject to the scope of protection of the claims.

The invention claimed is:

1. A body and hand association method, comprising:
acquiring an image to be detected of which an image content comprises a body and a hand;
determining a body bounding box of the body and a hand bounding box of the hand in the image to be detected;
determining an association probability between the body bounding box and the hand bounding box;
determining a circumscribed box of the body bounding box and the hand bounding box; and
determining a degree of association between the body and hand in the circumscribed box based on a hand key point in the circumscribed box and the association probability.

2. The method of claim 1, wherein determining the association probability between the body bounding box and the hand bounding box comprises:
determining a body feature of the body bounding box and a hand feature of the hand bounding box; and
determining the association probability between the body bounding box and the hand bounding box based on the body feature and the hand feature.

3. The method of claim 1, wherein determining the circumscribed box of the body bounding box and the hand bounding box comprises:
determining, as a target bounding box pair, a body bounding box and a hand bounding box between which an association probability is greater than a preset probability threshold; and
determining a circumscribed box of the body bounding box and the hand bounding box in the target bounding box pair.

4. The method of claim 3, wherein determining the circumscribed box of the body bounding box and the hand bounding box in the target bounding box pair comprises:
determining a candidate box that encloses the target bounding box pair; and
adjusting a cover area of the candidate box based on a relative positional relationship between the body bounding box and the hand bounding box in the target bounding box pair to obtain the circumscribed box.

5. The method of claim 3, wherein determining the degree of association between the body and hand in the circumscribed box based on the hand key point in the circumscribed box and the association probability comprises:
determining at least two target hand key points in the circumscribed box, the at least two target hand key points comprising key points that belong to two different hands of a same person respectively; and
determining, based on the at least two target hand key points, the degree of association between the body bounding box and the hand bounding box that form the circumscribed box.

6. The method of claim 5, wherein determining, based on the at least two target hand key points, the degree of association between the body bounding box and the hand bounding box that form the circumscribed box comprises:
determining a confidence that each target hand key point is a ground truth point;
in a case that any confidence is greater than a preset threshold, determining a distance from the target hand key point corresponding to the confidence greater than the preset threshold to the hand bounding box that forms the circumscribed box;
determining, based on the distance, a target association probability between the body bounding box and the hand bounding box that form the circumscribed box; and
determining, based on the target association probability, the degree of association between the body bounding box and the hand bounding box that form the circumscribed box.

7. The method of claim 6, wherein determining, based on the distance, the target association probability between the body bounding box and the hand bounding box that form the circumscribed box comprises:
in a case that the distance is less than or equal to a preset distance, determining the association probability between the body bounding box and the hand bounding box that form the circumscribed box to obtain an in-box association probability; and
determining the in-box association probability as the target association probability.

8. The method of claim 6, wherein determining, based on the distance, the target association probability between the body bounding box and the hand bounding box that form the circumscribed box comprises:
in a case that the distance is greater than a preset distance, decreasing the association probability between the body bounding box and the hand bounding box that form the circumscribed box to obtain a corrected association probability; and
determining the corrected association probability as the target association probability.

9. The method of claim 8, wherein decreasing the association probability between the body bounding box and the hand bounding box that form the circumscribed box to obtain the corrected association probability in the case that the distance is greater than the preset distance comprises:
in the case that the distance is greater than the preset distance, acquiring a preset adjustment parameter configured to adjust the association probability; and
lowering the association probability between the body bounding box and the hand bounding box that form the circumscribed box using the preset adjustment parameter to obtain the corrected association probability.

10. The method of claim 6, wherein determining, based on the at least two target hand key points, the degree of association between the body bounding box and the hand bounding box that form the circumscribed box comprises:
in a case that the at least two target hand key points comprise no target hand key point of which the confidence is greater than the preset threshold, decreasing the association probability between the body bounding box and the hand bounding box that form the circumscribed box to obtain a corrected association probability; and
determining the corrected association probability as the target association probability.

11. The method of claim 5, wherein the target hand key point comprises a wrist key point.

12. The method of claim 1, in a case of determining multiple body bounding boxes and/or multiple hand bounding boxes in the image to be detected, further comprising:
combining each detected body bounding box and each detected hand bounding box to obtain multiple bounding box pairs,
wherein determining the circumscribed box of the body bounding box and the hand bounding box comprises:

determining a circumscribed box of the body bounding box and the hand bounding box in each bounding box pair; and determining the degree of association between the body and hand in the circumscribed box based on the hand key point in the circumscribed box and the association probability comprises:

determining a degree of association between a body and hand in each circumscribed box to obtain a set of target degrees of association, determining a candidate degree of association greater than a preset association degree threshold in the set of target degrees of association, and based on a target circumscribed box corresponding to the candidate degree of association, determining a hand matching a body in the target circumscribed box.

13. A body and hand association apparatus, comprising:
a memory storing processor-executable instructions; and
a processor configured to execute the processor-executable instructions to perform operations of:
acquiring an image to be detected of which an image content comprises a body and a hand;
determining a body bounding box of the body and a hand bounding box of the hand in the image to be detected;
determining an association probability between the body bounding box and the hand bounding box;
determining a circumscribed box of the body bounding box and the hand bounding box; and
determining a degree of association between the body and hand in the circumscribed box based on a hand key point in the circumscribed box and the association probability.

14. The apparatus of claim 13, wherein determining the association probability between the body bounding box and the hand bounding box comprises:
determining a body feature of the body bounding box and a hand feature of the hand bounding box; and
determining the association probability between the body bounding box and the hand bounding box based on the body feature and the hand feature.

15. The apparatus of claim 13, wherein determining the circumscribed box of the body bounding box and the hand bounding box comprises:
determining, as a target bounding box pair, a body bounding box and a hand bounding box between which an association probability is greater than a preset probability threshold; and
determining a circumscribed box of the body bounding box and the hand bounding box in the target bounding box pair.

16. The apparatus of claim 15, wherein determining the circumscribed box of the body bounding box and the hand bounding box in the target bounding box pair comprises:
determining a candidate box that encloses the target bounding box pair; and
adjusting a cover area of the candidate box based on a relative positional relationship between the body bounding box and the hand bounding box in the target bounding box pair to obtain the circumscribed box.

17. The apparatus of claim 15, wherein determining the degree of association between the body and hand in the circumscribed box based on the hand key point in the circumscribed box and the association probability comprises:
determining at least two target hand key points in the circumscribed box, the at least two target hand key points comprising key points that belong to two different hands of a same person respectively; and
determining, based on the at least two target hand key points, the degree of association between the body bounding box and the hand bounding box that form the circumscribed box.

18. The apparatus of claim 17, wherein determining, based on the at least two target hand key points, the degree of association between the body bounding box and the hand bounding box that form the circumscribed box comprises:
determining a confidence that each target hand key point is a ground truth point;
in a case that any confidence is greater than a preset threshold, determining a distance from the target hand key point corresponding to the confidence greater than the preset threshold to the hand bounding box that forms the circumscribed box;
determining, based on the distance, a target association probability between the body bounding box and the hand bounding box that form the circumscribed box e; and
determining, based on the target association probability, the degree of association between the body bounding box and the hand bounding box that form the circumscribed box.

19. The apparatus of claim 18, wherein determining, based on the distance, the target association probability between the body bounding box and the hand bounding box that form the circumscribed box comprises:
in a case that the distance is less than or equal to a preset distance, determining the association probability between the body bounding box and the hand bounding box that form the circumscribed box to obtain an in-box association probability; and
determining the in-box association probability as the target association probability.

20. A non-transitory computer storage medium having stored thereon computer-executable instructions that, when executed by a processor, cause the processor to perform operations of:
acquiring an image to be detected of which an image content comprises a body and a hand;
determining a body bounding box of the body and a hand bounding box of the hand in the image to be detected;
determining an association probability between the body bounding box and the hand bounding box;
determining a circumscribed box of the body bounding box and the hand bounding box; and
determining a degree of association between the body and hand in the circumscribed box based on a hand key point in the circumscribed box and the association probability.

* * * * *